(12) United States Patent
Liu

(10) Patent No.: US 10,887,038 B2
(45) Date of Patent: Jan. 5, 2021

(54) GNSS-BASED MULTI-MODAL CLOCK CORRECTION

(71) Applicant: Samsung Electronics Co., Ltd., Suwon-si (KR)

(72) Inventor: Paul M. Liu, Saratoga, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/271,640

(22) Filed: Feb. 8, 2019

(65) Prior Publication Data

US 2020/0106542 A1 Apr. 2, 2020

Related U.S. Application Data

(60) Provisional application No. 62/739,100, filed on Sep. 28, 2018.

(51) Int. Cl.
| | | |
|---|---|---|
| *H04L 12/28* | (2006.01) | |
| *H04J 3/06* | (2006.01) | |
| *G05D 1/02* | (2020.01) | |
| *G06F 1/10* | (2006.01) | |
| *G06F 1/12* | (2006.01) | |
| *H04L 7/00* | (2006.01) | |

(52) U.S. Cl.
CPC .......... *H04J 3/0667* (2013.01); *G05D 1/0278* (2013.01); *G06F 1/10* (2013.01); *G06F 1/12* (2013.01); *H04L 7/0012* (2013.01); *H04L 7/0016* (2013.01)

(58) Field of Classification Search
None
See application file for complete search history.

(56) References Cited

U.S. PATENT DOCUMENTS

| | | | |
|---|---|---|---|
| 5,917,449 A | 6/1999 | Sanderford et al. | |
| 6,578,155 B1 | 6/2003 | Faucher et al. | |
| 2009/0066567 A1* | 3/2009 | Huang | G01S 19/23 342/357.62 |
| 2010/0220692 A1 | 9/2010 | Diab et al. | |
| 2013/0163617 A1* | 6/2013 | Chandra | G06F 13/4022 370/503 |

(Continued)

FOREIGN PATENT DOCUMENTS

JP 1996-251654 A 9/1996

OTHER PUBLICATIONS

European Search Report, Application No. 19192275.6, dated Feb. 6, 2020, pp. 1-10.

(Continued)

*Primary Examiner* — Elisabeth Benoit Magloire
(74) *Attorney, Agent, or Firm* — F. Chau & Associates, LLC

(57) ABSTRACT

A Grandmaster clock is presented. The Grandmaster clock has a GNSS interface receiving GNSS time sync data, a Real Time Clock (RTC) with a crystal oscillator, one or more communication interfaces exchanging data with clock correction sources, and a clock correction host. The clock correction host computes clock drift based on the GNSS time sync data and the data from clock correction sources, generating adjusted clock data, and writing the adjusted clock data to the RTC from different locations. The Grandmaster clock may be in a vehicle.

20 Claims, 10 Drawing Sheets

(56) References Cited

U.S. PATENT DOCUMENTS

| | | | |
|---|---|---|---|
| 2014/0111249 A1 | 4/2014 | Whitehead et al. | |
| 2014/0122755 A1* | 5/2014 | Chandra | G06F 13/4295 |
| | | | 710/106 |
| 2014/0281037 A1* | 9/2014 | Spada | H04J 3/0641 |
| | | | 709/248 |
| 2015/0097726 A1* | 4/2015 | Babitch | G01S 19/23 |
| | | | 342/357.62 |
| 2015/0103817 A1 | 4/2015 | Kuhn et al. | |
| 2015/0103818 A1 | 4/2015 | Kuhn et al. | |
| 2015/0124856 A1* | 5/2015 | Youssef | H04B 1/70755 |
| | | | 375/145 |
| 2015/0280718 A1* | 10/2015 | Mattos | H03L 1/022 |
| | | | 331/25 |
| 2017/0139411 A1* | 5/2017 | Hartung | G05D 1/0077 |
| 2019/0086545 A1* | 3/2019 | Mooney | G01S 17/88 |
| 2019/0088132 A1* | 3/2019 | Riggins | G05D 1/0297 |

OTHER PUBLICATIONS

Volgyesu, Peter et al., "Time Sychronization Services for Low-Cost Fog Computing Applications," 2017 International Symposium on Rapid System Prototyping (RSP), ACM, Oct. 19, 2017, pp. 57-63.

* cited by examiner

| | Description | Explanation | Caveats |
|---|---|---|---|
| 1 | GNSS Number of Satellites in view and tracking >= 5. | In order to get accurate time, the number of satellites tracked and used in the PVT solutions typically must exceed 5 in order to properly resolve time. | Does not work indoors in high multipath environments. |
| 2 | RTC clock skew, offset, and drift < acceptable tolerance from absolute time. | GNSS tend to have the more accurate time from absolute, wired Ethernet next, and then wireless. Selection of source can be determined from calibration. | In highly dynamic environment, this metric may not be accurate. |
| 3 | Clock correction is based on varying frequency of corrections. | Clock correction accuracy can be improved by increasing the frequency of the correction. | Increased power utilization by the system. |
| 4 | Frequency adjustments to ensure power optimization. | Dynamic operation of method 3 above to decrease the frequency as soon as the desired accuracy is achieved. The power optimization includes the powering off of the clock correction system (including the host) in order to save power. | Getting in and out of low power mode may not always result in the lowest power usage from the system. Wireless modems tend to have very high power-on requirements. |

FIG. 5A

Clock Correction Selection
(Neural Network - aTraining)

Clock Correction Selection
(Neural Network - Decision)

GNSS-BASED MULTI-MODAL CLOCK CORRECTION

CROSS REFERENCE TO RELATED APPLICATIONS(S)

This application claims the benefit of U.S. Provisional Patent Application No. 62/739,100 filed on Sep. 28, 2018, the content of which is incorporated by reference herein.

BACKGROUND

This disclosure relates to a method and apparatus for synchronizing clocks across a plurality of domains.

One common way devices synchronize themselves in the time domain is by autocorrelation with the Global Navigation Satellite System (GNSS) clock. Unfortunately, the perfect synchronization between the clock in the satellite and the clock in the device receiver is difficult to achieve. Since these widely separated clocks (one on Earth and one in space) cannot be in perfect lockstep with one another, the codes they generate cannot be in perfect sync either. Naturally, a time shift is present due to the disagreement between these two clocks. The time shift not only contains the signal's transit time from the satellite to the receiver, it contains clock errors, too. In fact, whenever satellite clocks and receiver clocks are checked against the carefully controlled GNSS time, a drift is found. Their oscillators are imperfect. They are subject to the destabilizing effects of temperature, acceleration, radiation, and other inconsistencies. As a result, various devices synchronizing to the GNSS do not automatically result in the different devices, which may be in different domains, being perfectly synchronized with one another.

Operation of an autonomous vehicle requires a precise way to synchronize input data, perform the necessary computation, and output commands to control the vehicle. Three domains are involved in making an autonomous vehicle operate effectively: the Vehicle domain, the Edge domain, and the Cloud Computing domain. The Vehicle domain includes multiple electronic control modules, sensors, and actuation devices, as shown in FIG. 8. Each of these devices typically are clocked by internal crystal oscillators. The Edge domain involves time synchronization between two or more vehicles (V2X) and between the vehicles and surrounding infrastructure, or edge (V2I). The Cloud Computing domain involves a group of computers/servers that communicate with the Vehicle and the Edge. Precise time synchronization among the three domains is required to ensure cloud-to-edge-to-vehicle coordination that result in safe, effective operation of the vehicles. Any ambiguity in time reference could yield disastrous results.

There is a need for a method of accurately synchronizing the Vehicle domain, the Edge domain, and the Cloud Computing domain to prevent accidents and disasters.

SUMMARY

In one aspect, the inventive concept includes a Grandmaster clock (GMC) that has a GNSS interface receiving GNSS time sync data, a Real Time Clock (RTC) with a crystal oscillator, one or more communication interfaces exchanging data with clock correction sources, and a clock correction host computing clock drift based on the GNSS time sync data and the data from clock correction sources, generating adjusted clock data, and writing the adjusted clock data to the RTC.

In another aspect, the inventive concept includes a method of establishing a Grandmaster clock. The method entails obtaining GNSS time sync data; checking whether sync error using GNSS time sync data is within a predefined range; checking whether sync error using data from one or more clock correction sources is within a predefined range; computing a correction to Real Time Clock (RTC) if any sync error is outside the predefined range; and applying the correction to RTC.

In yet another aspect, the inventive concept pertains to an autonomous vehicle that includes a plurality of sensors and a grandmaster clock to which the plurality of sensors are synchronized. The grandmaster clock includes a GNSS interface receiving GNSS time sync data, a Real Time Clock (RTC) including a crystal oscillator, one or more communication interfaces exchanging data with clock correction sources; and a clock correction host computing clock drift based on the GNSS time sync data and the data from clock correction sources, generating adjusted clock data, and writing the adjusted clock data to the RTC.

BRIEF DESCRIPTION OF THE DRAWINGS

FIG. 5A is a table showing possible ways to achieve a clock with a high enough reliability to be the master clock.

DETAILED DESCRIPTION

One way to achieve the precise time synchronization among the domains is to establish an accurate authoritative clock source to which all the various devices can synchronize. The synchronized time base ensures that relevant time based data can be timestamped and sent to various computation platforms, including cloud platforms. In one embodiment, computations may be done on the data, coherent timestamping applied to the processed information, and the processed information is transmitted back to the vehicle with timestamp data. The method and apparatus disclosed herein provide an accurate global time reference that has the desired accuracy and precision to operate with a wireless connection to the cloud Compute platform (multiple time domains) or within the vehicle as a standalone platform (one time domain).

A method and system are desired to not only determine time accuracy within range of a time domain but also how to transition in and out of the synchronized time domain range while keeping correct time. For example, a time domain can be GNSS. Sometimes one is in a situation where GNSS is not available (out of range). The Grandmaster Clock (GMC) should be able to keep accurate time until one is back in range and can do immediate corrections.

The method and apparatus described herein use a central authoritative source of synchronized timing information within a vehicle that may be engaged in automotive driving. The central authoritative source of synchronized timing includes a processor that has a Real Time Clock with a highly stable crystal oscillator. The central authoritative source software runs on the Clock Correction Host. More specifically, the method and apparatus disclosed herein involve dynamic adaptive clock selection and use of neural networks to optimize accuracy, lower power usage, and reduce cost. The method and apparatus allow highly accurate synchronization in multiple time domains and operating modes while lowering power usage and reducing cost.

Current vehicular time sensitive networks and standards (e.g., IEEE 802.1AS, Time Sensitive Networks) typically deal with one time domain and the time domain is defined as vehicle only (local time). These networks and standards do not address how to manage crystal oscillator drift, skew, and aging. As a result, the conventional vehicular time technologies require multiple time transformations to ensure a world-wide time representation. Managing time conversion inclusive of clock drift over a large distributed system (vehicle, infrastructure, and cloud) relies on an error-prone process that can potentially yield catastrophic results.

Figure 1:
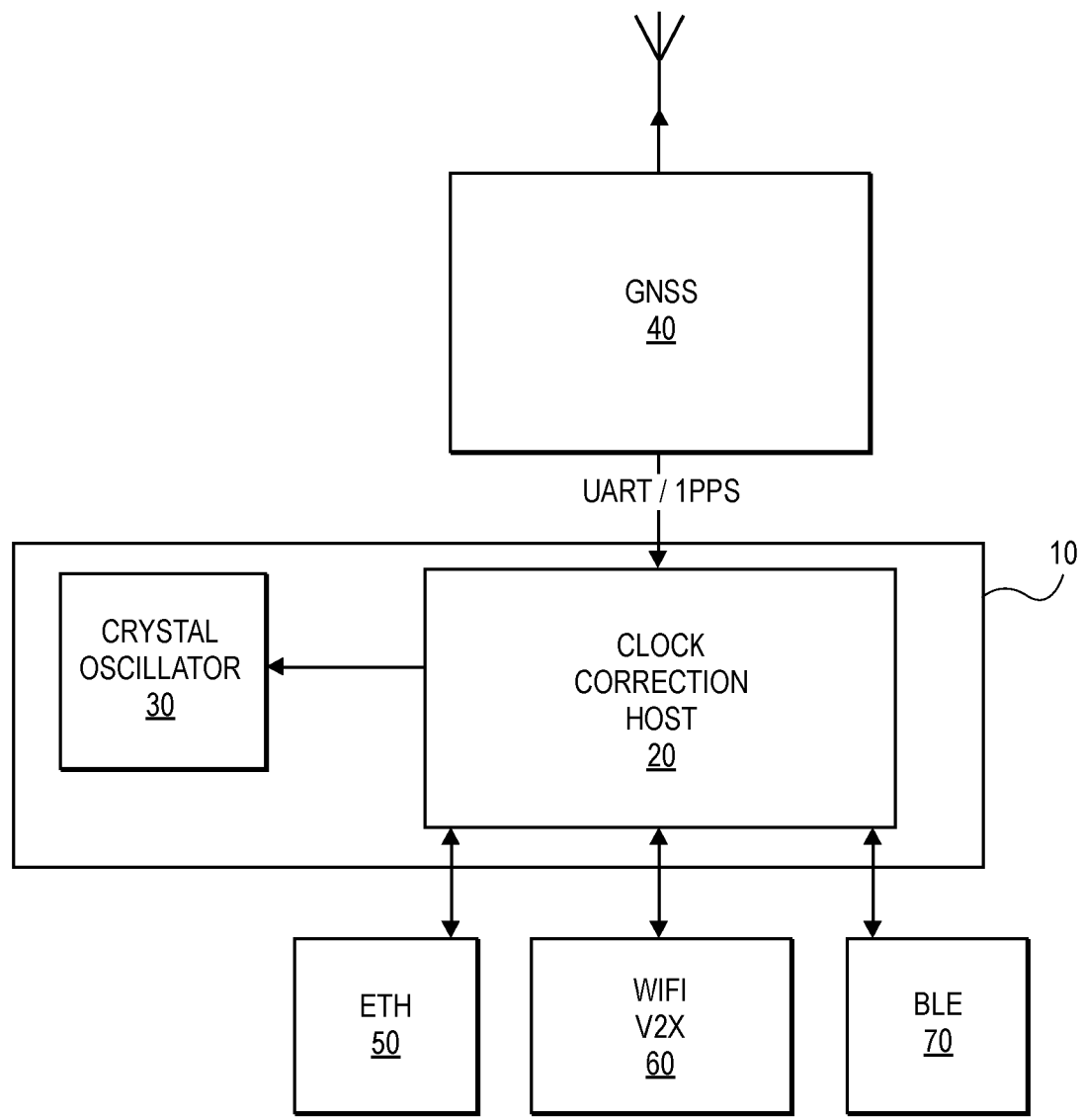
FIG. 1 is a block diagram depicting an exemplary embodiment of the Grandmaster Clock in accordance with the inventive concept.

FIG. 1 is a block diagram depicting an exemplary embodiment of the Grand Master Clock in accordance with the inventive concept. As shown, the Grand Master Clock 10 includes a Clock Correction Host 20 (which is a processing unit) and a Crystal Oscillator 30. The Clock Correction Host is responsible for correcting the local Crystal Oscillator 30. The Crystal Oscillator 30 may be a battery-backed Real Time clock. The correction may be done using the data from GNSS source 40, Ethernet (ETH) 50, Wireless source (WiFi) 60, and near-field communication (BLE) 70.

A GNSS Receiver 40 communicates with the Grandmaster Clock 10. The GNSS Receiver 40 may have a UART/1PPS sync interface for supplying GNSS time sync information to the Grand Master Clock 10. The interface between the GNSS Receiver 40 and the Grandmaser Clock (GMC) 10 may be unidirectional, with satellites providing data to the Grand Master clock 10. The Grand Master Clock 10 includes extra host wireless and wired communication interfaces that may be used for clock correction sources such as ETH 50, WiFi or V2X 60, and BLE 70. Data flow between the Grand Master Clock 10 and the extra interfaces 50, 60, 70 may be bidirectional. The extra interfaces 50, 60, 70 may be on the same chip as the GMC 10 or external.

The layout depicted in FIG. 1 stands in stark contrast to the conventional layout in which one GNSS is attached to one device (e.g., a sensor). The layout of FIG. 1 moves away from the layout where each device has its own GNSS, to a model in which the clock correction is performed almost like a server with multiple clients. The Master Clock can request periodic time synchronization.

The Grandmaster Clock 10 may be part of an autonomous vehicle, and functions the same regardless of whether the autonomous vehicle is moving or stationary. In one embodiment, the GMC 10 utilizes the existing vehicular power source. Hence, the GMC 10 is conscious about optimizing power usage. While GMC 10 acts as a central authoritative timing source in a specific time domain, it is possible to have more than one GMC in a vehicle acting in separate time domains. For example, a GMC can implement a server and a client on two time domains, e.g. the server time domain being the "primary" domain and the client domains being the "backup" domains. This configuration allows the GMC to act as a primary time server, and as a backup time client if a higher-accuracy GMC is discovered. Hence, the GMC supports multiple time domains and allows time correction transfers from one time domain to another.

Figure 2:
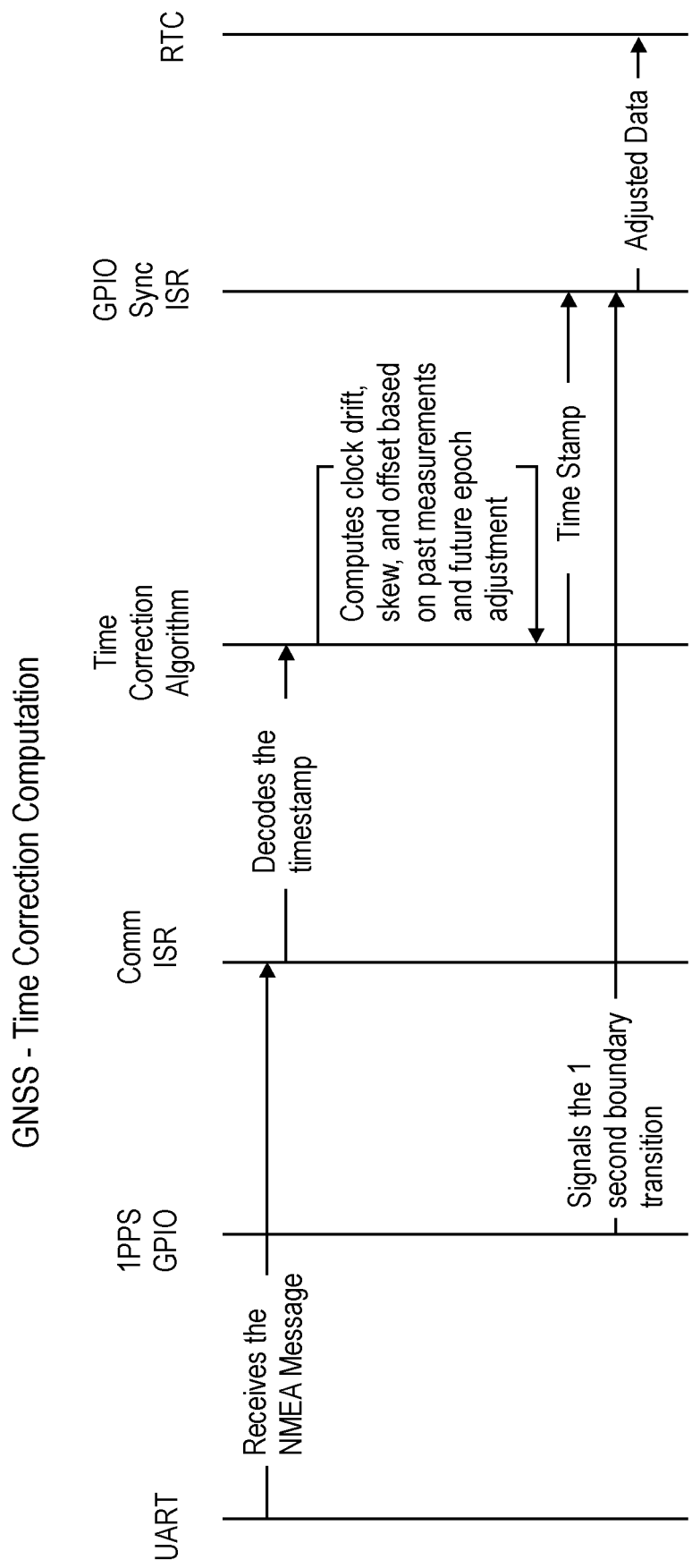
FIG. 2 is a diagram that depicts the GNSS time correction computation used by the Clock Correction Host to establish itself as the Grandmaster clock.

FIG. 2 is a diagram that depicts the GNSS time correction computation used by the Clock Correction Host 20 to establish itself as the highest accuracy clock, or the Grandmaster clock. The goal of the clock Correction Host 20 is not simply to improve the accuracy of a GNSS position; rather, the goal is to become the authoritative time source for other clocks by using the GNSS time data. The Clock Correction Host 20 corrects the local crystal oscillator 30, which is typically a battery-backed Real Time Clock, using the GNSS source 40, Ethernet source 50, wireless source 60, and near-field communication 70. As shown, a message with a timestamp in accordance with the NMEA (National Marine Electronics Association) standard is received by the Universal Asynchronous Receiver/Transmitter (UART). It is forwarded to the Communication Interrupt Service Routine (CISR), which decodes the timestamp by computing clock drift, skew, and offset based on past measurements. The time Correction Method operates on fully-formed software and hardware timestamps, and applies the computed parameters to make an adjustment to the clock data. The clock Correction Host 20 can work with synchronous or asynchronous interfaces.

The 1 PPS (pulse per second) General-Purpose IO (GPIO) signals the 1-second boundary transition to the GPIO Synchronous ISR, which then writes the adjusted clock data to Real-time Clock (RTC). This process helps determine how much drift is going to happen over the next second, thereby achieving an absolute time. Using the process of FIG. 2, the Clock Correction Host 20 makes itself the Grandmaster Clock.

Figure 3:
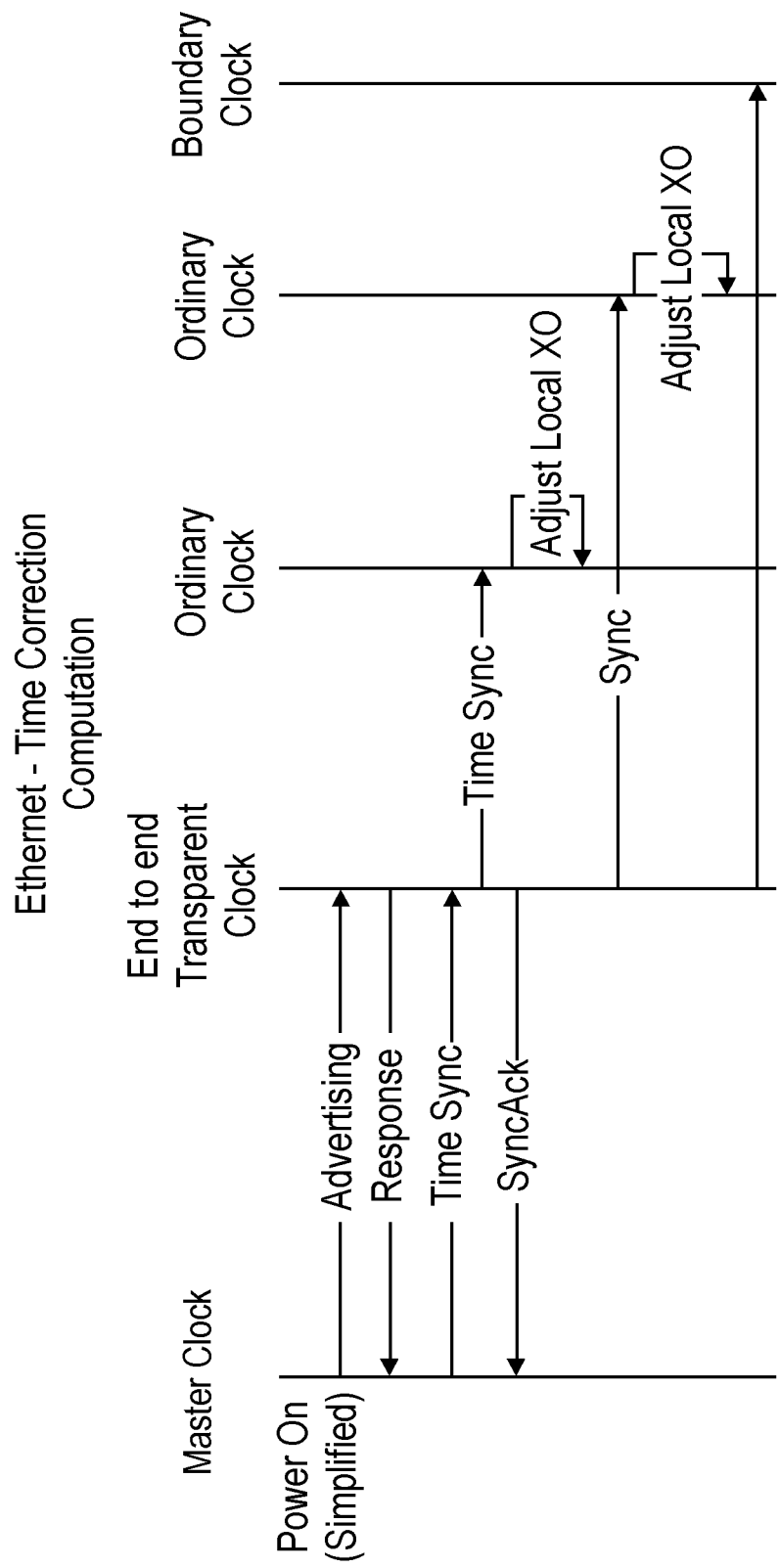
FIG. 3 depicts how the Grandmaster Clock functions as the highest authority of time synchronization in interacting with an Ethernet source.

FIG. 3 depicts how the Grandmaster Clock functions as the highest authority of time synchronization in interacting with an Ethernet network. As shown, at Power-On, the Master Clock ping-pongs signals back and forth with the Ethernet's End-to-end Transparent Clock to achieve synchronization between the two clocks. The Transparent Clock timestamps the sync messages that are received or transmitted. Consistently with IEEE 1588 convention, the departure and arrival timestamps are used to make adjustments and synchronize the time between the Grandmaster Clock and other clocks. The Transparent Clock sends synchronization signals to Ordinary Clocks, each of which makes an adjustment as needed on a local level. The Transparent Clock also sends a signal to Boundary Clock. The Boundary Clock may receive time from the Transparent Clock, set its own clock, and generate new sync messages from its own clock.

Figure 4:
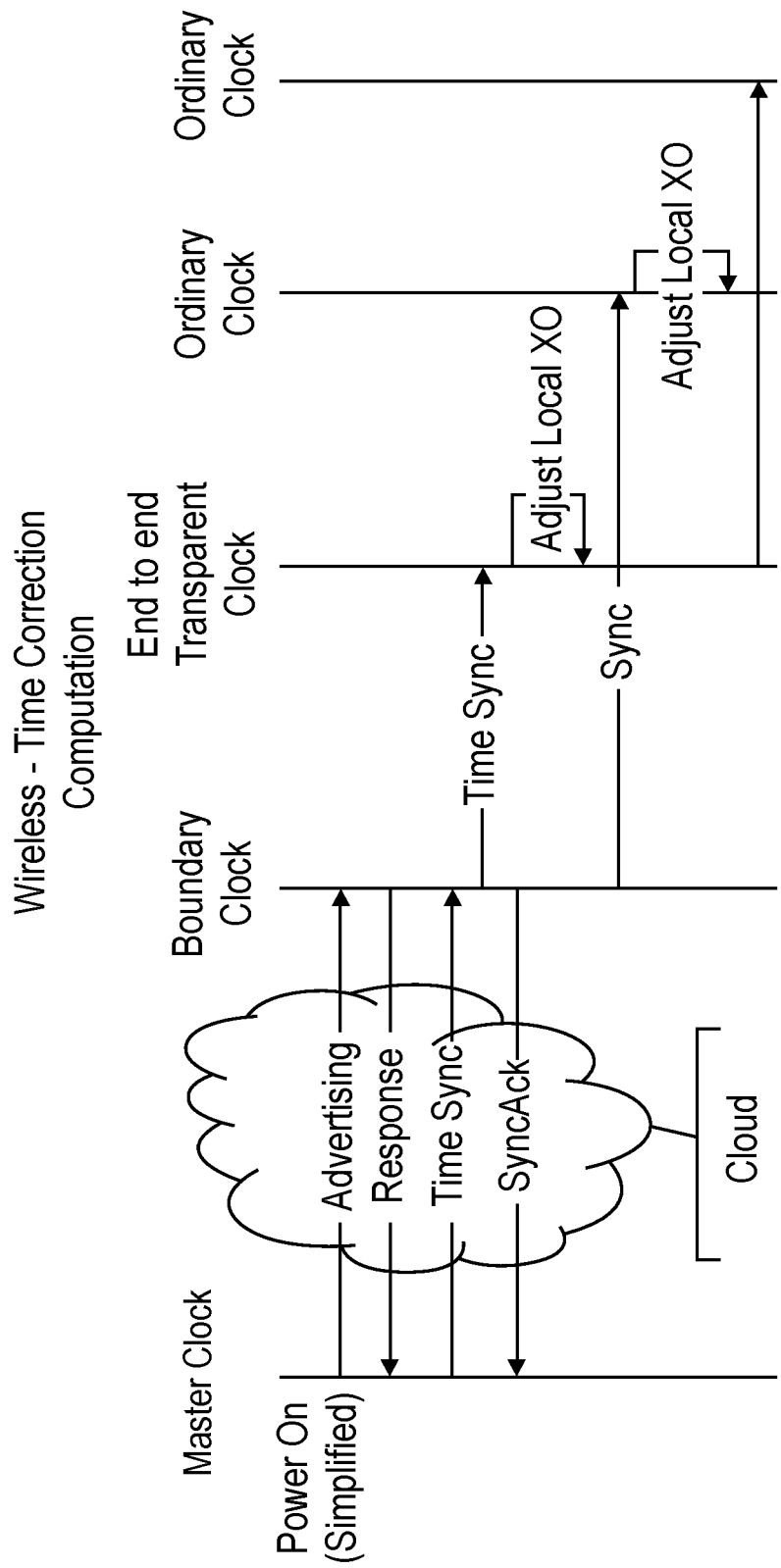
FIG. 4 depicts how the Grandmaster Clock functions as the highest authority of time synchronization in interacting with a Wireless source.

FIG. 4 depicts how the Grandmaster Clock functions as the highest authority of time synchronization in interacting with a Wireless network. As shown, at Power-On, the Grandmaster Clock and the Boundary Clock of the Wireless network exchange synchronization signals back and forth to determine a synchronization adjustment, via the cloud. The Boundary Clock sends its time sync signals to Transparent Clock and Ordinary Clocks in its network(s). FIGS. 3 and 4 demonstrate how the Grandmaster Clock communicates its time to the slaves.

The Grandmaster Clock messaging protocol described herein allows management of timestamps in more than one time domain. Since the Grandmaster clock provides a timing service that operates in world time format, no time transformation is required in order to interpret the data unless expressly desired. For example, if the GMC provides timing data in a world time format such as Coordinated Universal Time (UTC), and a user wants to display the data in his/her local time zone, the conversion can be made without impacting the time integrity of the system.

FIG. 5A is a table showing possible ways to achieve a clock with reliability that is high enough to be the master clock. GNSS, for example, is generally known to have good accuracy. However, as shown in FIG. 5A, one limitation of relying on the GNSS for accurate information is that to get accurate time, the number of satellites tracked and used must typically exceed 5. Naturally, the accuracy of GNSS becomes compromised in an indoor setting or in high multipath environments. A Real Time Clock (RTC) suffers from clock skew, offset, and drift. Unless those parameters are within an acceptable tolerance limit relative to absolute time, RTC cannot be relied on as the master clock. In a highly dynamic environment where near-perfect synchronization among different time zones and devices is needed to avoid accidents and disasters, the accuracy of RTC may not be reliable enough to be the master clock. GNSS tends to have more accurate time than RTC when the skew, offset, and drift are taken into account, then wired Ethernet, and then wireless, in that order. Source selection may be determined from calibration. In a highly dynamic environment, this metric may not be accurate.

The accuracy of RTC may be improved with frequency of corrections. However, increased frequency of correction is accompanied by increased power consumption. The increased power consumption is undesirable. To mitigate the increase in power consumption, frequency of corrections itself may be dynamically adjusted to optimize power consumption and accuracy. With this dynamic frequency adjustment, clock correction may be performed at high accuracy until the desired accuracy level is achieved, at which point the frequency of correction is decreased. The clock correction system (including the host) may be powered off to save power. This dynamic frequency adjustment method is not without disadvantages. For example, getting in and out of lower power mode or turning the power on and off can consume a lot of power. Wireless modems often have high power-on requirements.

Figure 5B:
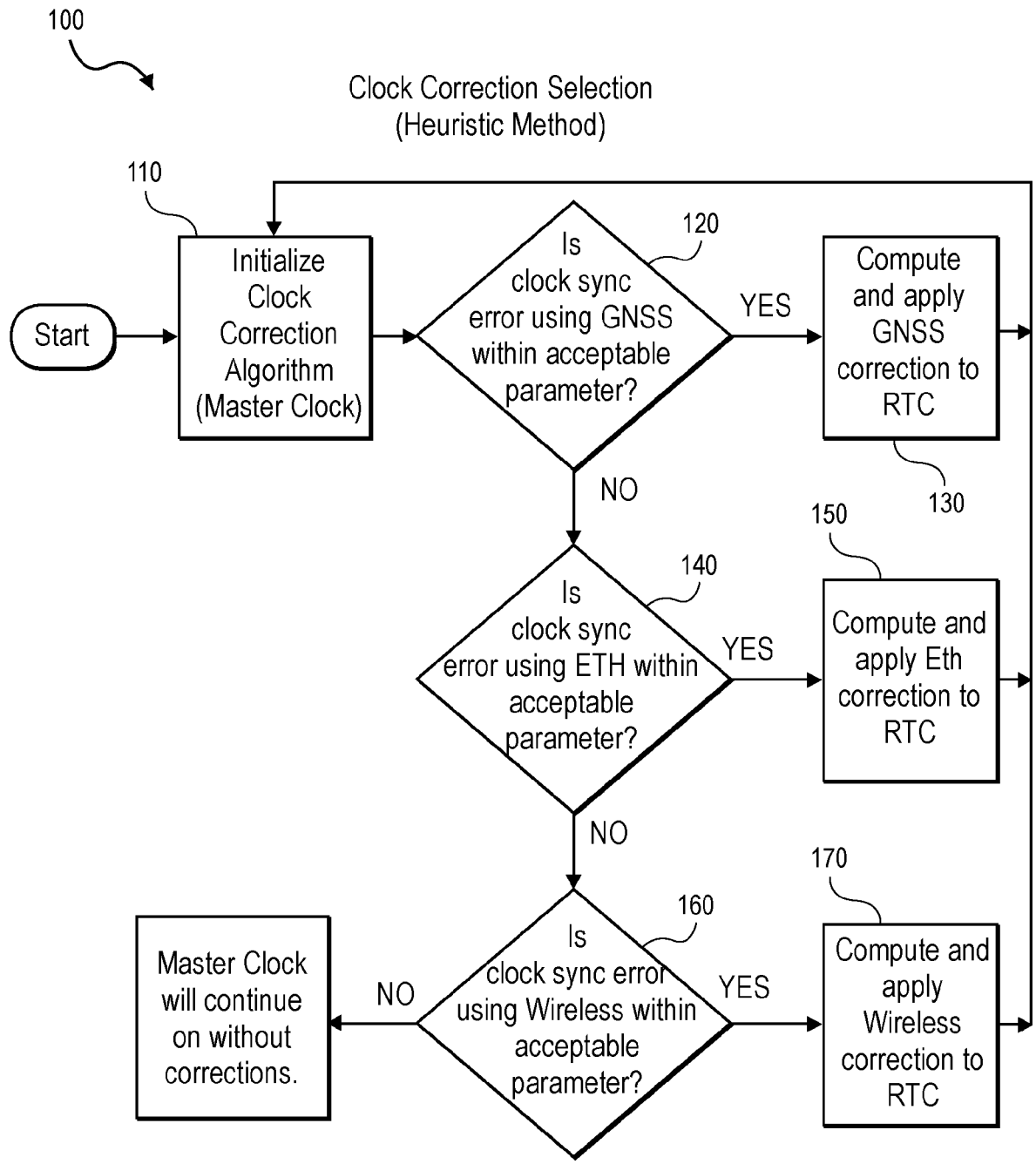
FIG. 5B depicts a Source Selection Process by which the Clock Correction Host determines the best source to use for adjusting the internal crystal oscillator to account for clock skew, drift, and offset, in accordance with one embodiment of the inventive concept.

FIG. 5B depicts a Source Selection Process 100 by which the Clock Correction Host 20 determines the best source to use for adjusting the internal crystal oscillator 30 to account for clock skew, drift, and offset. The particular Source Selection Process 100 is a heuristic method, and starts by initializing the Clock Correction Process 110. Clock sync error using GNSS is checked to see if it is within a predefined acceptable parameter (120). If the clock sync error is within the acceptable parameter, GNSS correction is computed and applied to RTC (130). If, on the other hand, the clock sync error for GNSS is outside the predefined acceptable parameter, the clock sync error using Ethernet is checked to see if it falls within a acceptable parameter (140).

If the answer is "Yes," the Ethernet Correction is computed and applied to RTC (150). If the Ethernet clock sync error falls outside the predefined parameter, the clock sync error using Wireless is checked (160). If the error is within the predefined acceptable parameter, the Wireless correction is computed and applied to RTC (170). If all clock sync sources have unacceptable errors, then the internal crystal oscillator (OCXO) is considered the authoritative clock source without any corrections.

In one embodiment of the heuristic method above, the GPS may be chosen as the default clock. When GPS data is not available, the fallback would be Internet or Wireless, in that order, depending on the magnitude of sync error. One of the disadvantages of the heuristic method is that it is static.

Figure 6A:
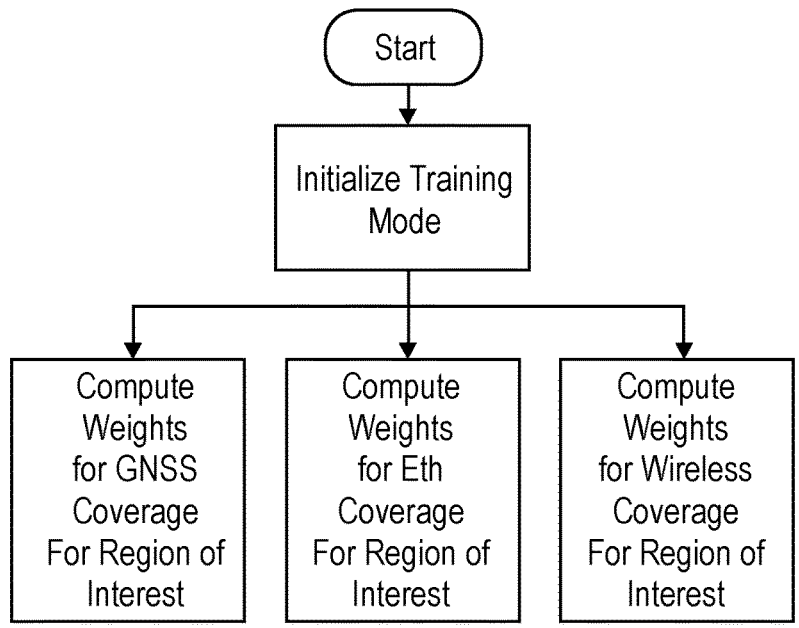
FIG. 6A depicts a neural network training process for determining clock correction source in accordance with one embodiment of the inventive concept.
Figure 6B:
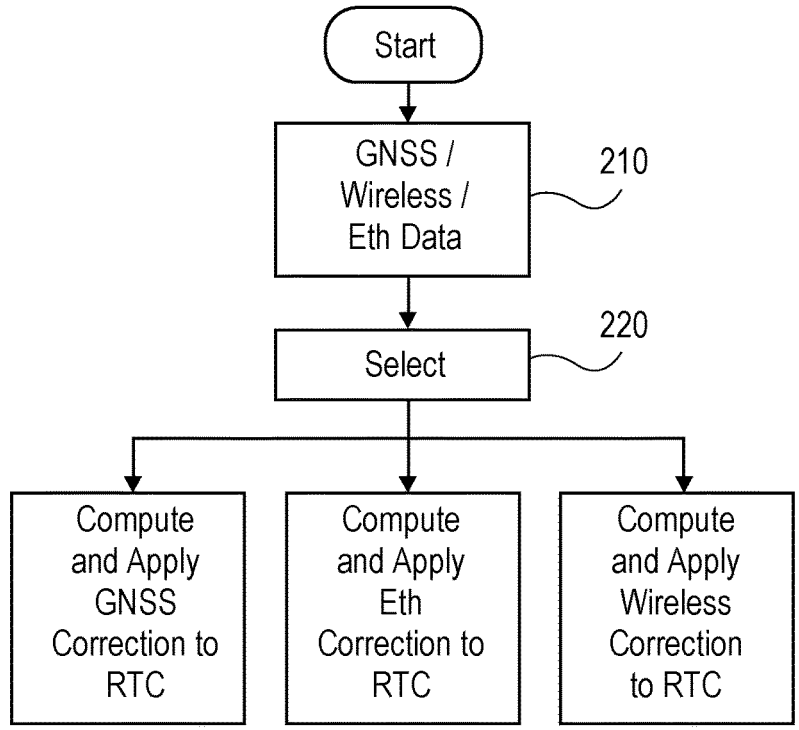
FIG. 6B depicts a process for determining clock correction source using neural network, in accordance with one embodiment of the inventive concept.

FIG. 6A and FIG. 6B depict a Source Selection Process 200 by which the Clock Correction Host 20 determines the source to use for adjusting the internal crystal oscillator 30 using neural network, in accordance with an embodiment of the inventive concept. During the training process depicted in FIG. 6A, the GMC records and gains access to information including signal strengths for Internet and wireless, satellite views, etc. at the same location. The weight determination may be done for each region of interest. Training entails computing or otherwise determining the weights for the different time sources such as GNSS, Ethernet, and Wireless, and may be done in the environments where the weight determinations are expected to be made.

Figure 6C:
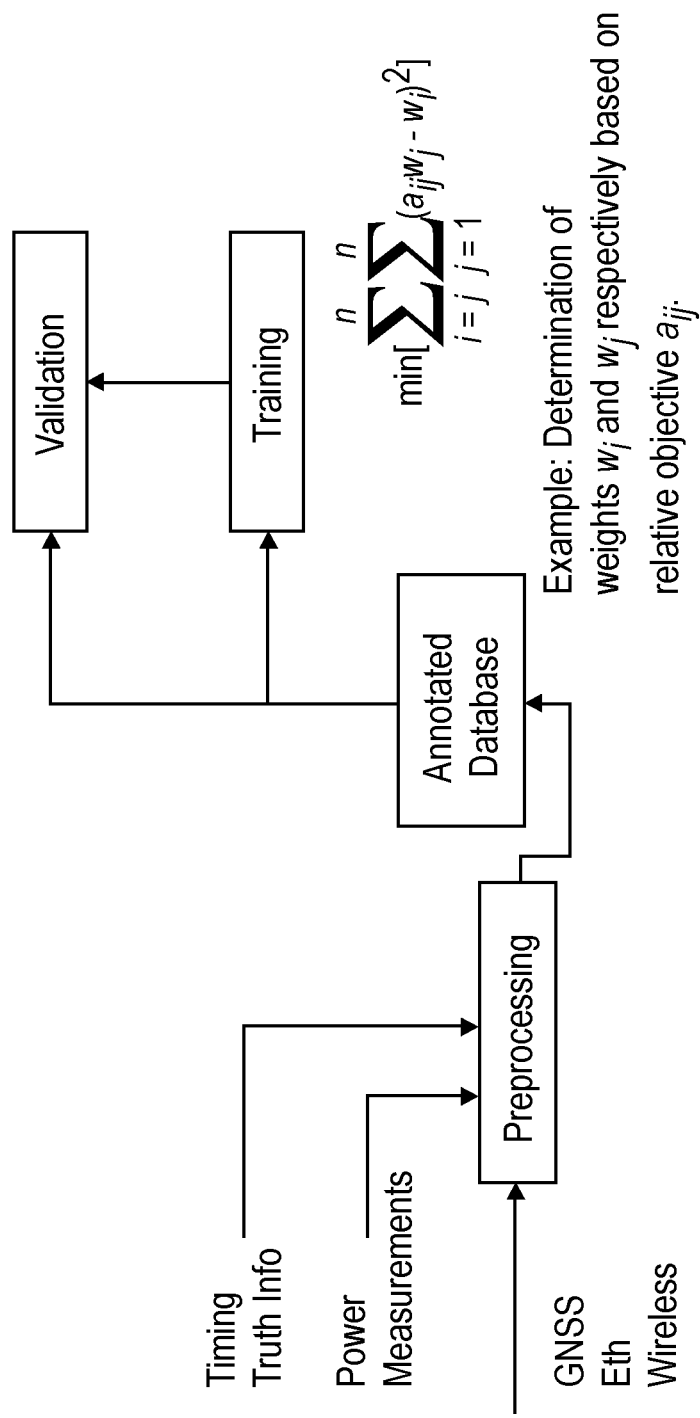
FIG. 6C shows an example of weight optimization for neural network training, in accordance with the inventive concept.

FIG. 6C shows an example of weight optimization based on a relative distance criteria. The weights are determined based on annotated collected data from GNSS, Ethernet, and Wireless together with timing truth info and actual device power measurements. These data get preprocessed and stored in an annotated database. The database is then used as training source for the neural network based on constrained optimization methods, such a relative distance criteria. In the validation stage, one or more machine-learning algorithms are applied in order to ensure a high positive correlation with minimum false negatives. Weights $w_i$ and $w_j$ are determined based on relative objective $a_{ij}$, in the following manner:

$$\text{Min}[\Sigma_{i=j}^n \Sigma_{j=1}^n (aijwj - wi)^2].$$

Other methods of weight optimization or constraints may be used.

Unlike the heuristic method depicted in FIG. 5A and FIG. 5B, the method of FIG. 6A and FIG. 6B uses neural network and includes optimized learning and/or adaptive supervised learning to achieve the desired clock accuracy and/or power consumption level. If the neural network model is adaptive, then the clock correction source determination may be made by gradually improving clock accuracy inferences, thus minimizing the need for neural network training. The neural network model may be helpful in dealing with the dynamic environment that the vehicle moves through.

The GMC messaging software operates over the selected interface(s) when selected. There is no restriction on how many interfaces are used, provided the low profiles and clock accuracy are met. The neural network is trained by using the process depicted in FIG. 6A. As shown, weights for coverage for the region of interest is computed for the different interfaces available, which are GNSS, Ethernet, and Wireless in the example used. The weights may be re-computed as regions of interest change. Then, as shown in FIG. 6B, the GNSS/Wireless/Ethernet Data are reviewed (210) and a selection is made (220) for one of them based on the computed correction.

Both the heuristic method of FIGS. 5A and 5B and the neural net-based method of FIGS. 6A and 6B allow a Grandmaster Clock to also function as a Master Backup, providing redundancy in two different time zones.

The dynamic nature of the neural network-based method 200 makes it easy to adjust the source depending on the conditions of the environment the vehicle is in. For example, if the vehicle travels from an urban area to a rural area, the source can be changed automatically to minimize power consumption without compromising time accuracy. Typically, in an urban area with many vehicles and obstacles, accuracy will be prioritized over power consumption. The reverse will be true in a rural area.

Figure 7:
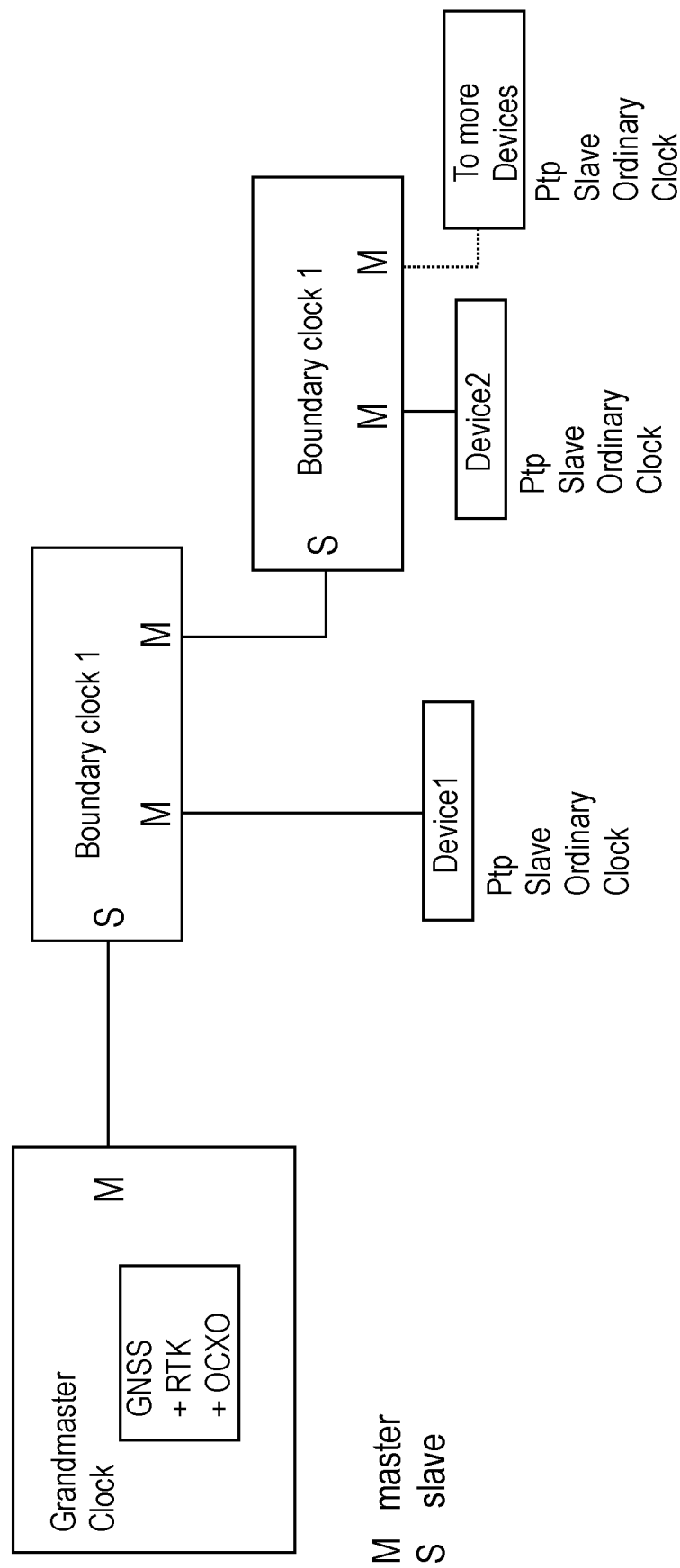
FIG. 7 depicts an exemplary embodiment of the inventive concept including connected and mobile systems using IEEE 1588 with World Time.
Figure 8:
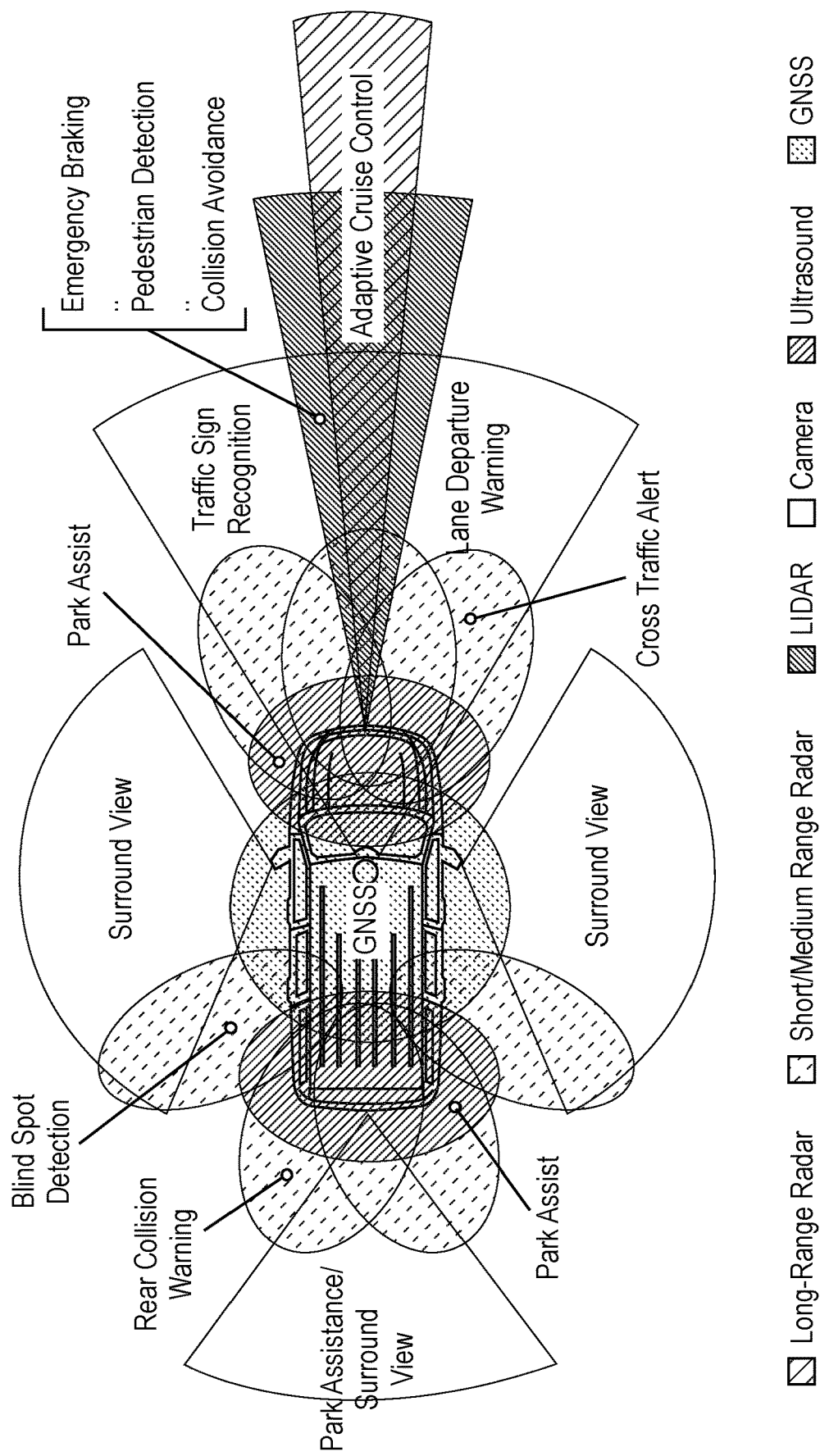
FIG. 8 depicts examples of sensors and devices in a vehicle domain.

FIG. 7 depicts an exemplary embodiment of the inventive concept including connected and mobile systems using IEEE 1588 with World Time. The GMC in this example includes GNSS+RTK+OCXO. GNSS combined with real-time kinematics (RTK) and crystal oscillator (OCXO) provides a grand master clock with a reasonable accuracy. When GNSS satellites are in view, the grand master clock accuracy is corrected using one of the clock correction processes described above. When not enough GNSS satellites are in view, the timing accuracy of the grandmaster clock may degrade based on the crystal oscillator characteristics. IEEE 1588 may be used to provide frequency and time synchronization in wireless base station backhaul, at 50 ppb and sub-microsecond accuracy. IEEE 1588 is widely deployed in distributed computer backend networks and supported on multiple Ethernet links including 10 Gbps links. Various devices are synchronized with the boundary clocks, which in turn are synchronized with the Grandmaster clock.

In a vehicle, there is usually only one master and multiple slaves (e.g., IEEE 801.2AS). These parts operate in a single time domain in a vehicle. The disadvantage is that there is no provision for having a backup time domain. The GMC messaging protocol allows management of timestamps in more than 1 time domain. For example, the GMC can implement one time server and multiple time client instance (instance of time domain). Thus, the GMC can implement multiple time domains and if there is a failure in one GMC, a backup GMC can take over immediately. The purpose for the multiple instances of time domain is to allow more than 1 GMC to be in the system (e.g., on the vehicle). The ability of the Grandmaster clock to support multiple time domains and provide primary and backup time service increases the reliability of the timing service.

In the example shown in FIG. 7, each GMC would be responsible as the authoritative time source for one time domain, but can simultaneously act as the backup client for another GMC in a different time domain. This is distinguishable from the conventional setup of having only one GMC. The ability of the GMC to support more than one time domain allows more than one GMC on the vehicle, and provides primary and backup time service. This setup increases the reliability of the timing service.

In the manner described above, the grand master clock (GMC) ensures and achieves the highest level of clock accuracy in a vehicle. A "vehicle," as used herein, refers to any piece of hardware capable of moving or being moved from one geographic location to another and controlled either remotely or locally, including but not limited to automobiles, airplanes, trains, boats, and drones. The GMC is responsible for discovery, configuration, and handshake with every interface from which it may receive clock correction. The GMC uses either a heuristic process or a neural network-based process to optimize the clock correction source selection for the purpose of achieving the highest clock accuracy and low power modes. Since the GMC is actively managing clock accuracy, the GMC is the authoritative source of timing for the vehicle.

In one embodiment, the GMC may manage time in a world time format (a single, unified time zone format) rather than local time format. The world time format defines a timestamp that can be correlated in real time with other systems that support world time formats, such as UTC. With the GMC providing a timing service that operates in world time format, no time transformation is needed to interpret the data unless expressly desired. If the GMC provides timing data in UTC and the user wanted to display the data in local timezone, the user may perform the adjustment without impacting the time integrity of the system.

While the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the inventive concept disclosed herein. Such apparatus may include circuits, dedicated and/or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

While the inventive concept has been described with reference to exemplary embodiments, it will be apparent to those skilled in the art that various changes and modifications may be made without departing from the spirit and scope of the inventive concept.

What is claimed is:

1. A mobile grandmaster clock comprising:
 a Global Navigation Satellite System (GNSS) interface receiving GNSS time sync data;
 a Real Time Clock (RTC) with a crystal oscillator;
 one or more communication interfaces exchanging data with clock correction sources; and
 a clock correction host computing clock drift based on the GNSS time sync data and the data from clock correction sources, generating adjusted clock data, and writing the adjusted clock data to the Real Time Clock (RTC) from different locations,
 wherein the grandmaster clock supports multiple time domains.

2. The mobile grandmaster clock of claim 1, wherein the writing of the adjusted clock data includes a General Purpose Input/Output(GPIO) Synchronous Interrupt Service Routine (ISR) receiving a GPIO signal indicating a boundary transition to determine an amount of future clock drift.

3. The mobile grandmaster clock of claim 1, wherein the computing of the clock drift is done using past measurements.

4. The mobile grandmaster clock of claim 1, wherein the clock correction sources include one or more of Ethernet, Wireless source, and near-field communication source.

5. The mobile grandmaster clock of claim 1, wherein the data exchange channels between the clock correction sources and the clock correction host are two-way channels.

6. The mobile grandmaster clock of claim 1, wherein the grandmaster clock manages time in a world time format.

7. The mobile grandmaster clock of claim 1, wherein the grandmaster clock functions as a primary time server in its domain and a backup time server for another grandmaster clock.

8. The mobile grandmaster clock of claim 1, wherein the grandmaster clock allows time correction transfers from one time domain to another.

9. A method of establishing a grandmaster clock by actively managing Real Time Clock (RTC) accuracy, comprising:
- obtaining Global Navigation Satellite System (GNSS) time sync data;
- checking whether sync error using GNSS time sync data is within a predefined range;
- checking whether sync error using data from one or more clock correction sources is within a predefined range;
- computing a correction to RTC if any sync error is within the predefined range; and
- applying the correction to RTC from different locations, wherein the grandmaster clock supports multiple time domains.

10. The method of claim 9, further comprising determining weighting factors for GNSS time sync data and data from the one or more clock correction sources.

11. The method of claim 9, wherein the determining is done based on at least one of: minimizing clock skew, minimizing clock drift, minimizing clock offset, and minimizing power consumption.

12. The method of claim 9, wherein the weighting factors are changed dynamically for different regions of interest, as regions of interest change.

13. The method of claim 9, wherein the computing of the correction comprises:
- receiving a National Marine Electronics Association (NMEA) message;
- decoding a timestamp of the (NMEA) message; and
- signaling a one-second boundary transition.

14. The method of claim 9, wherein the computing of the correction comprises calculating clock drift, skew, and offset based on past measurements.

15. The method of claim 9, wherein one of the clock correction sources is Ethernet, further comprising exchanging time sync signals with a transparent clock of the Ethernet such that the transparent clock transmits time sync signals to other clocks.

16. The method of claim 9, wherein one of the clock correction sources is a Wireless source, further comprising exchanging time sync signals with a boundary clock of the Wireless source.

17. The method of claim 9, wherein one of the clock correction sources is a near-field communication source.

18. The method of claim 9, further comprising simultaneously providing a backup time service to another Grandmaster clock.

19. An autonomous vehicle comprising:
- a plurality of sensors; and
- a grandmaster clock to which the plurality of sensors are synchronized, the grandmaster clock comprising:
  - a Global Navigation Satellite System (GNSS) interface receiving GNSS time sync data;
  - a Real Time Clock (RTC) including a crystal oscillator;
  - one or more communication interfaces exchanging data with clock correction sources; and
  - a clock correction host computing clock drift based on the GNSS time sync data and the data from clock correction sources; generating adjusted clock data, and writing the adjusted clock data to the RTC,
- wherein the grandmaster clock supports multiple time domains.

20. The autonomous vehicle of claim 19, wherein the grandmaster clock is a first grandmaster clock, further comprising a second grandmaster clock, wherein the first grandmaster clock and the second grandmaster clock provide backup time service for each other.

* * * * *